(12) United States Patent
Archibald et al.

(10) Patent No.: US 8,005,682 B2
(45) Date of Patent: Aug. 23, 2011

(54) CONTROL OF A NON-ACTIVE CHANNEL IN A MULTI-CHANNEL RECEIVER

(75) Inventors: James L. Archibald, Schnecksville, PA (US); Robert C. Malkemes, Bethlehem, PA (US); Jinguo Yu, Flemington, NJ (US)

(73) Assignee: Agere Systems Inc., Allentown, PA (US)

( * ) Notice: Subject to any disclaimer, the term of this patent is extended or adjusted under 35 U.S.C. 154(b) by 965 days.

(21) Appl. No.: 11/930,886

(22) Filed: Oct. 31, 2007

(65) Prior Publication Data
US 2009/0112603 A1   Apr. 30, 2009

(51) Int. Cl.
*G10L 21/00*   (2006.01)
(52) U.S. Cl. ......................................................... 704/275
(58) Field of Classification Search ................... 704/275
See application file for complete search history.

(56) References Cited

U.S. PATENT DOCUMENTS
6,956,795 B2 * 10/2005 Schwartz ........................ 369/7
2004/0171377 A1    9/2004 Engstrom ..................... 455/419

* cited by examiner

*Primary Examiner* — Susan McFadden
(74) *Attorney, Agent, or Firm* — Mendelsohn, Drucker, & Associates, P.C.; Edward J. Meisarosh; Steve Mendelsohn

(57) ABSTRACT

In one embodiment, a satellite radio receiver is capable of simultaneously processing (i) a first radio channel that is playing on a first speaker and (ii) a second radio channel, different from the first radio channel, that is not playing on the first speaker. The second radio channel can simultaneously be playing on a second speaker, be recorded onto a non-volatile memory, and/or have its processing modified. A user can control the satellite radio receiver using vocal commands, while the first channel is playing on the first speaker. The radio receiver has a microphone connected to a voice-recognition command interpreter that includes an interfering-sound canceller, which reduces sounds interfering with the vocal commands, and a command-recognition module, which recognizes vocal commands and provides a control signal to a multi-channel control processor, which processes and controls the first and second radio channels, received from corresponding decoders connected to a satellite radio receiver antenna.

22 Claims, 2 Drawing Sheets

100

CONTROL OF A NON-ACTIVE CHANNEL IN A MULTI-CHANNEL RECEIVER

BACKGROUND OF THE INVENTION

1. Field of the Invention

The current invention relates to multimedia receivers, and particularly to multimedia receivers capable of simultaneously decoding multiple radio channels.

2. Description of the Related Art

Traditional radio receivers are analog devices that tune to a particular frequency that corresponds to a particular broadcasting station. The analog signal recovered by the receiver can then be manipulated in many ways known in the art, such as, for example, adjusting the signal's amplitude or recording the signal onto electromagnetic media. Digital radio systems comprise digital receivers that decode a channel of a broadcast digital radio signal and retrieve the signal of a station of interest. The broadcast digital radio signal may contain data for multiple stations, but only one station is decoded at any given time for the user to listen to and control.

A satellite radio is one type of digital radio system wherein broadcasting antennas are located on earth-orbiting satellites. A satellite radio receiver is a popular option for automobiles since it allows a user, i.e., a driver and/or passenger, to listen to a selected station, out of scores of available stations, from any automobile location across an extremely large area. For example, a single digital radio satellite can broadcast to about half of the North American continent. In contrast, the coverage area of terrestrial broadcasting antennae is geographically much more limited, often limited to a radius of several miles.

One implementation of a satellite radio system is the Satellite Digital Audio Radio System (SDARS). SDARS uses satellite antennas in concert with terrestrial retransmission antennas to provide users broad and robust coverage. The terrestrial retransmission antennas are useful in urban landscapes where, because of tall buildings nearby, a digital radio receiver may have difficulty receiving the signal provided by an orbiting satellite. An SDARS system is described, for example, in U.S. Pat. No. 6,724,827 to Patsiokas et al, incorporated herein by reference.

Digital radio receivers are now becoming available which can decode two or more digital radio channels simultaneously, wherein each channel can tune to a separate station, i.e., each channel is independently tunable. One use of such systems is to stream a selected audio station on one channel while streaming traffic or weather data on a second channel for visual display. Another use is to allow a user to listen to one selected channel while recording a second channel for later playback. Novel means for controlling multiple simultaneously decoded channels would be useful.

SUMMARY OF THE INVENTION

One embodiment of the invention can be a system comprising a first speaker, a multi-channel control processor, and a voice-recognition command interpreter. The multi-channel control processor is adapted to simultaneously process (1) a first radio channel, which is outputted by the multi-channel control processor for playing on the first speaker and (2) a second radio channel different from the first radio channel, which second radio channel is not outputted by the multi-channel control processor for playing on the first speaker. The voice-recognition command interpreter is adapted to (i) recognize at least one vocal command while the first radio channel is played on the first speaker and the second radio channel is not played on the first speaker, and (ii) output a control signal to cause the multi-channel control processor to modify processing of the second radio channel based on the recognized vocal command while the first radio channel is played on the first speaker.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

A unique challenge is involved in designing means for controlling multiple simultaneously decoded channels in an automobile receiver since the means should allow a driver to focus on his or her primary task, which is driving, while allowing the driver to simultaneously play one channel and manipulate a second channel. Note that this is different from simply switching from playing a first channel to playing a second channel, manipulating the second channel, and then returning to playing the first channel.

Figure 1:
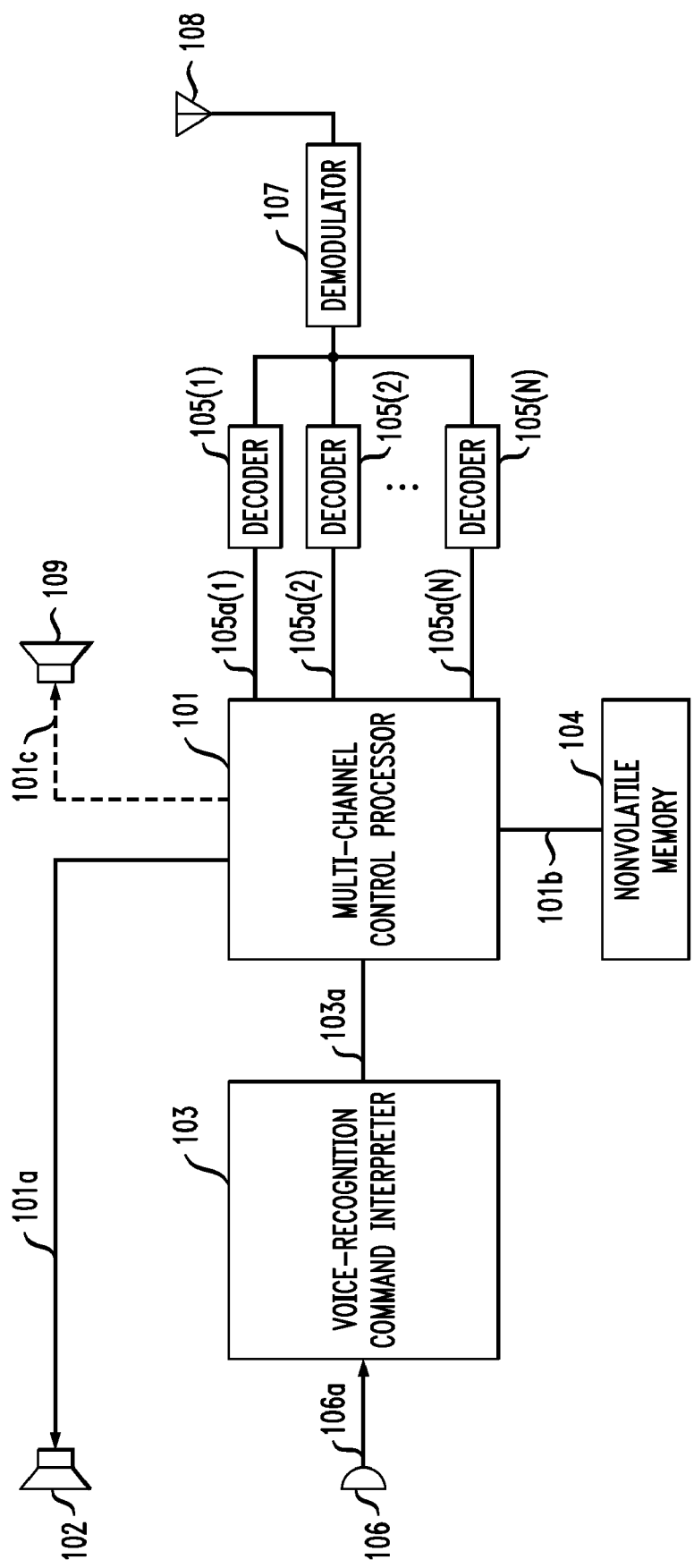
FIG. 1 shows a simplified block diagram of a satellite radio receiver in accordance with one embodiment of the present invention.

FIG. 1 shows a simplified block diagram of satellite radio receiver 100 in accordance with one embodiment of the present invention. Radio receiver 100 comprises digital multi-channel control processor 101, which is connected to speaker 102, voice-recognition command interpreter 103, nonvolatile memory (NVM) 104, and decoders 105(1)-(N). Radio receiver 100 further comprises (i) microphone 106 connected to voice-recognition command interpreter 103, (ii) demodulator 107 connected to decoders 105(1)-(N), and (iii) antenna 108 connected to demodulator 107.

Multi-channel control processor 101 is adapted to receive and simultaneously decode receiver channels 105a(1)-(N) received from corresponding channel decoders 105(1)-(N). Decoder 105(i) can tune to any one of the multiple stations available to radio receiver 100 and stream it on corresponding receiver channel 105a(i). Decoders 105(1)-(N) receive a digital signal from demodulator 107. Note that additional and/or alternative devices and/or processors on the path from antenna 108 to decoders 105(1)-(N) are not shown. The particular stations available to radio receiver 100 at a particular time depend on the service(s), if any, to which radio receiver 100 is subscribed, and the particular location of radio receiver 100 at the particular time.

Control processor 101 is adapted to output audio signal 101a to speaker 102 so that speaker 102 plays selected radio channel 105a(i) and a user can listen to a selected station streaming on radio channel 105a(i). By default, speaker 102 plays the station selected on channel 1. Control processor 101 is adapted to record a second selected station streaming on radio channel 105a(j) using NVM 104, wherein radio channel 105a(j) is not played on speaker 102. Voice-recognition command interpreter 103 (i) receives voice-command input from microphone 106, (ii) interprets the command using a digital signal processor (DSP) (not shown), (iii) determines which command, if any, was spoken, and (iv) provides a digital signal corresponding to the determined command to control processor 101 via control signal 103a.

In one implementation, radio receiver 100 is installed in an automobile. The driver can control radio receiver 100 while driving by using voice commands, which allows the driver to simultaneously also (i) maintain visual focus on the road and (ii) keep his or her hands on the steering wheel. Control processor 101 is adapted to control one radio channel that is not playing on speaker 102, while a different radio channel that is played on speaker 102. Thus, for example, the driver can listen to a first selected station on receiver channel 105a(1) and simultaneously provide commands to tune receiver channel 105a(2) to a desired second station, and to record the second station streaming on receiver channel 105a(2) using specified parameters (e.g., volume, sample rate, and file name) for a specified length of time.

Table 1, below, provides sample voice commands and the corresponding functions they perform for radio receiver 100. These voice commands and respective functions may be factory-preprogrammed or they may be custom-programmed by the user. The sample commands in Table 1 start with "radio" or "channel" as a key word to reduce the chance of inadvertently changing the settings of radio receiver 100 by coincidental combinations of words used in conversation by the driver and/or passengers. Other methods known in the art, such as voice-tone analysis, may be used, in addition or in the alternative, to reduce the probability of inadvertent command-processing. In this implementation, radio commands that do not specify a channel are assumed to refer to channel 1.

TABLE 1

| VOICE RECOGNITION COMMANDS | ACTUAL RADIO COMMANDS |
|---|---|
| "Radio on" | Radio ON |
| "Radio off" | Radio OFF |
| "Radio louder" | [Channel 1] Volume up |
| "Radio softer" | [Channel 1] Volume down |
| "Radio Mute" | [Channel 1] Mute ON |
| "Radio No mute" | [Channel 1] Mute OFF |
| "Channel 2 mute" | Channel 2 Mute ON |
| "Channel 2 no mute" | [Channel 1] Mute OFF |
| "Channel 1 volume 1" | Set channel 1 volume to level 1 |
| "Channel 2 volume 3" | Set channel 2 volume to level 3 |
| "Radio Scan up" | [Channel 1] Scan up (find next available station) |
| "Radio Scan down" | [Channel 1] Scan down |
| "Channel 1 gets X" | Select Channel 1 = X |
| "Channel 1 Record" | Record Channel 1 |
| "Channel 1 Play" | Playback Channel 1 |
| "Channel 1 Rewind" | Rewind Channel 1 |
| "Channel 1 FF" | Fast Forward Channel 1 |
| "Channel 2 gets Y" | Select Channel 2 = Y |
| "Channel 2 Record" | Record Channel 2 |
| "Channel 2 Play" | Playback Channel 2 |
| "Channel 2 Rewind" | Rewind Channel 2 |
| "Channel 2 FF" | Fast Forward Channel 2 |
| "Channel 2 Record at 3:30 pm for 30 minutes at 20" | Record Channel 2 at 3:30 for 30 minutes at 20,000 samples per second |

Figure 2:
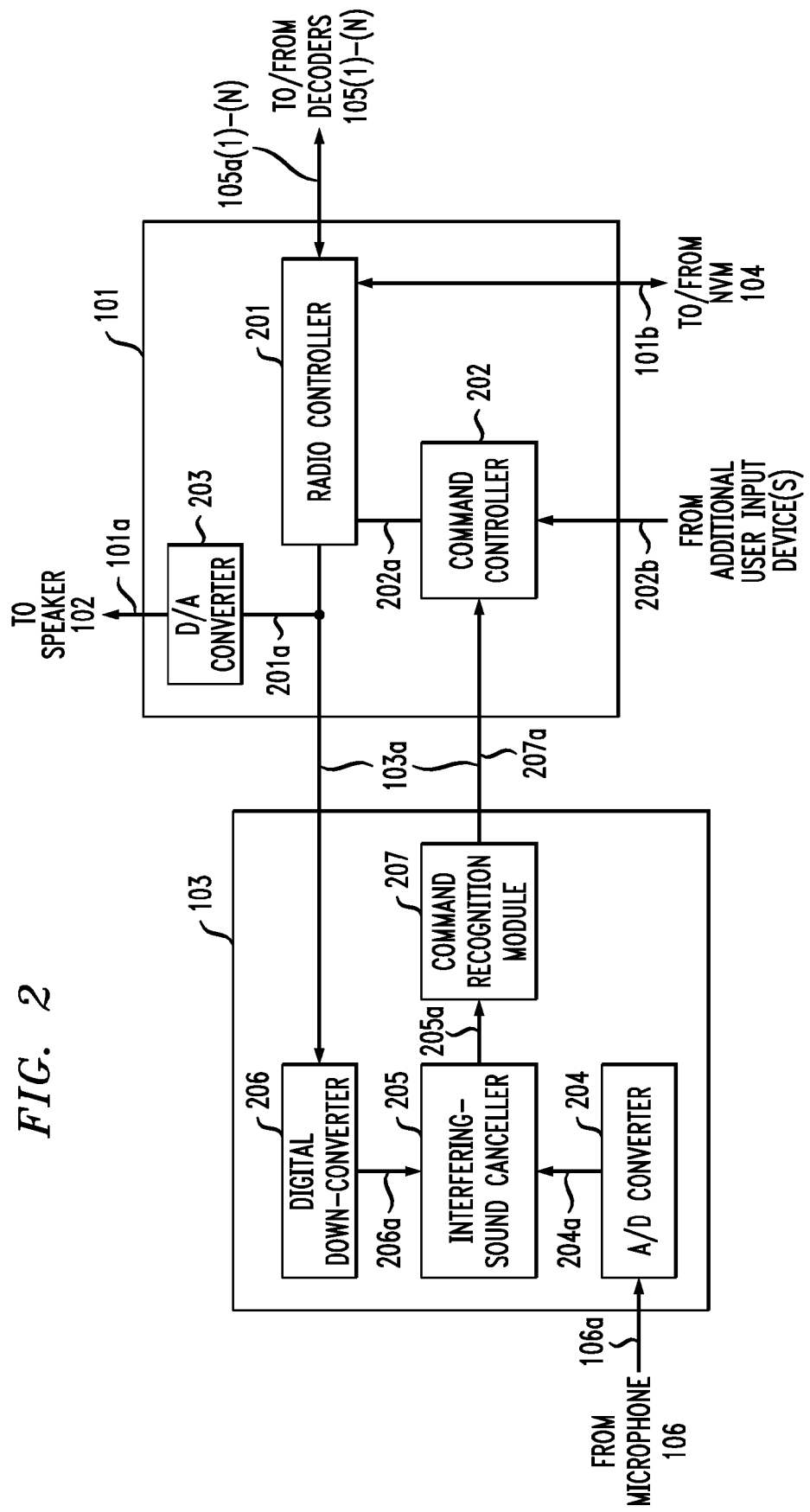
FIG. 2 shows a more-detailed block diagram of some of the components of the receiver of FIG. 1.

FIG. 2 shows a more-detailed block diagram of a segment of radio receiver 100 of FIG. 1, including voice-recognition command interpreter 103 and multi-channel control processor 101. Multi-channel control processor 101 comprises radio controller 201, D/A converter (DAC) 203, and command controller 202. Radio controller 201 receives receiver channels 105a(1)-(N) from decoders 105(1)-(N) and outputs a selected decoded receiver channel via 40 kHz digital signal 201a. Output signal 201a is received by DAC 203, which is adapted to convert digital signal 201a into analog signal 101a. DAC 203 outputs analog signal 101a to speaker 102, which plays the selected station for the user. Output signal 201a is also provided to voice-recognition command interpreter 103 for interfering-sound cancellation, described below.

Radio controller 201 controls decoders 105(1)-(N), e.g., selecting a station for decoder 105(i) to tune to. Radio controller 201 communicates with nonvolatile memory 104 via path 101b. Radio controller 201 is in turn controlled by command controller 202 via path 202a. Command controller 202 receives commands from voice-recognition command interpreter 103 via signal 207a. Control signal 207a and output signal 201a are part of communication path 103a of FIG. 1. Command controller 202 also receives commands via path 202b from additional user-input devices, such as buttons, knobs, and dials on a dashboard and/or steering panel.

Voice-recognition command interpreter 103 comprises A/D converter (ADC) 204, interfering-sound canceller 205, digital down-converter 206, and command-recognition module 207. ADC 204 receives and digitizes analog signal 106a from microphone 106. ADC 204 samples signal 106a at 8 kHz, which is a typical sampling rate used for human voices. ADC 204 outputs digital signal 204a, which is provided to interfering-sound canceller 205. Interfering-sound canceller 205 subtracts the background sound, if any, that results from the selected streaming receiver channel and picked up by microphone 106. Interfering-sound canceller 205 does this by subtracting, from signal 204a, signal 206a, which corresponds to the receiver channel playing on speaker 102. The source for corresponding signal 206a is output signal 201a, which is received from multi-channel control processor 101 via path 103a. Digital output signal 201a, which is at 40 kHz, is down-sampled by digital down-converter 206, which outputs the 8 kHz corresponding signal 206a.

Interfering-sound canceller 205 would prevent audible output on speaker 102, which may coincidentally sound like a command for radio receiver 100, from inadvertently changing the settings for radio receiver 100. Interfering-sound canceller 205 also performs audio processing to eliminate echoes that may be caused by the user's voice and/or speaker output reverberating inside the automobile.

Interfering-sound canceller 205 outputs signal 205a, which substantially corresponds to the spoken words of the user, obtained by substantially removing interfering sounds from the sound picked up by microphone 106, as described above. Command-recognition module 207 analyzes signal 205a to determine whether any command had been spoken. If command-recognition module 207 determines that a valid command, e.g., any command from Table 1, was spoken, then command-recognition module 207 provides a corresponding signal to command controller 202 via path 207a so that the requested command may be executed.

Command-recognition module 207 may recognize invalid attempts by a user to provide a valid command and may alert the user that the attempt is invalid by providing an appropriate instruction to command controller 202. For example, if a user issues a command to tune a non-existent receiver channel, then multi-channel control processor 101 indicates that the requested receiver channel does not exist. As another example, if the user says something that is unintelligible to command-recognition module 207, but which is determined to be intended to be a command, then multi-channel control processor 101 may ask the user to speak more clearly or repeat the request. Multi-channel control processor 101 provides the above feedback through any of a variety of means, as would be appreciated by one of ordinary skill in the art. For example, feedback could be provided by (i) visual indication on a status screen, (ii) playback of prerecorded messages, and/or (iii) a text-to-speech conversion module.

In one implementation of radio receiver 100, multi-channel control processor 101 may output selected receiver channel 105a(k) to optional speaker 109 via path 101c. For example, the driver may have channel 105a(1) playing through speaker 102, while a passenger may have channel 105a(2) playing through headphones 109. If, for example, the driver wants to say something to the passenger, the driver can command radio receiver 100 to mute channel 2, as exemplified in Table 1, so that the passenger can more-easily hear the driver. Alternatively, the driver could command radio receiver 100 to lower the volume on channel 2, or set the volume to a particular level.

In one alternative implementation of radio receiver 100, microphone 106 performs the necessary analog to digital conversion and the cancellation of interfering sounds. For example, microphone 106 has a directional microphone to capture the sound of the user's commands, an ambient microphone to capture ambient sounds, and a processor to digitize the analog signals, remove ambient sounds from the signal captured by the directional microphone, and output digital signal 106a. Thus, digital signal 106a goes directly to command-recognition module 207, and voice-recognition command interpreter 103 does not include digital down-converter 206, interfering-sound canceller 205, and ADC 204 of FIG. 2.

In one alternative implementation of radio receiver 100, a portion of path 101a and or 101c is digital. For example, digital signals may be transmitted from multi-channel control processor 101 to speakers 102 and/or 109 using Inter-IC Sound (I2S, I²S, or IIS) format, wherein speakers 102 and/or 109 include any necessary components to convert the I2S signal to audible sound. Other components of radio receiver 100 may also communicate using the I2S format. As another example, components of radio receiver 100 may communicate with each other using Universal Asynchronous Receive/Transmit (UART) ports.

In one embodiment of the invention, a portion of the path from multi-channel processor 101 to a speaker is wireless. For example, speaker 102 may be in the form of headphones, where path 101a includes a wireless transmitter and a wireless receiver. In addition or alternatively, multi-channel control processor 101 may output selected receiver channel 105a(k) to optional speaker 109 via wireless path 101c. In some implementations, the wireless portions of paths 101a and/or 101c utilize Bluetooth technology. In some implementations, the wireless portions of paths 101a and/or 101c utilize local FM modulation, wherein an FM transmitter transmits a low-power FM radio signal that can be picked up by a nearby FM receiver tuned to the appropriate frequency. In some implementations, the wireless portions of paths 101a and/or ACC utilize WiFi technology, such 802.11b/g transmitters and/or receivers.

In one embodiment of the invention, a portion of the path from microphone 106 to voice-recognition command interpreter 103 is wireless, where path 106a includes a wireless transmitter and a wireless receiver, where the wireless portion of path 106a may utilize Bluetooth technology.

Embodiments of the invention have been described using an ADC of a particular first sampling rate and a DAC adapted for processing a signal having a second sampling rate. The invention is not limited to those particular rates. In particular, the first and/or second sampling rates may be different from those described. In one alternative embodiment, the first and second sampling rates are equal, thereby making digital down-converter 206 unnecessary. In another embodiment, interfering-sound canceller 205 is adapted to process signals of different frequencies, thereby making digital down-converter 206 unnecessary. In one embodiment, the first and/or second sampling rates are programmable dynamically or at reset.

In an alternative embodiment of voice-recognition command interpreter 103, voice-recognition command interpreter 103 does not have an ADC such as ADC 204 of FIG. 2. Received microphone signal 106a is (i) digital and (ii) provided directly to interfering-sound canceller 205.

Voice-recognition command interpreter 103 of FIG. 1 can be any voice-recognition command interpreter presently known in the art or developed in the future. Voice-recognition command interpreter 103 can be dynamically programmable to learn new commands and/or to better recognize different users' voices. Voice-recognition command interpreter 103 can be set to recognize a range of variations in pronunciations without being dynamically programmable.

Embodiments of the present invention have been described as receivers of digital satellite radio broadcasts. However, the invention is not limited to digital satellite radio. In one embodiment, the broadcasting system is a terrestrial-only multi-channel digital radio system. In another embodiment, the broadcasting system is a multi-channel analog radio system. In yet another embodiment, the broadcasting system is a multi-channel digital television broadcasting system. In yet another embodiment, the broadcasting system is an analog television broadcasting system. In yet another embodiment, the broadcasting system is a non-television multimedia broadcasting system. As used herein, unless otherwise indicated, the term radio refers to the wireless transmission of signals, by modulation of electromagnetic waves with frequencies below those of visible light, wherein the signals may convey any type of information.

The term "nonvolatile memory," as used herein, refers to any type of memory that substantially retains its stored contents after disconnection from its power supply, i.e., the stored contents can be retrieved after reconnecting the nonvolatile memory to a power supply. Examples of nonvolatile memory include, but are not necessarily limited to (i) charge-storing devices such as EEPROM and flash ROM, (ii) magnetic media devices such as hard drives and tapes, and (iii) optical, opto-electrical, and opto-magnetic media such as CDs and DVDs. The nonvolatile memory can include data buffers in volatile memory, e.g., RAM.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

Signals and corresponding nodes or ports may be referred to by the same name and are interchangeable for purposes here.

We claim:

1. A system comprising:
   a first speaker;
   a multi-channel control processor adapted to simultaneously process (1) a first radio channel, which is outputted by the multi-channel control processor for playing on the first speaker and (2) a second radio channel different from the first radio channel, which second radio channel is not outputted by the multi-channel control processor for playing on the first speaker; and
   a voice-recognition command interpreter adapted to:
      recognize at least one vocal command while the first radio channel is played on the first speaker and the second radio channel is not played on the first speaker; and
      output a control signal to cause the multi-channel control processor to modify processing of the second radio channel based on the recognized vocal command while the first radio channel is played on the first speaker, wherein the multi-channel control processor comprises:
      a radio controller adapted to receive, process, control, and output (i) the first radio channel to the first speaker and (ii) the second radio channel to an other component.

2. The system of claim 1, wherein the multi-channel control processor is adapted to simultaneously process one or more additional radio channels.

3. The system of claim 1, wherein the multi-channel control processor is connected to multiple decoders, wherein:
   a first decoder of the multiple decoders provides the first radio channel to the multi-channel control processor; and
   a second decoder of the multiple decoders provides the second radio channel to the multi-channel control processor.

4. The system of claim 3, wherein:
   each decoder is adapted to be independently tuned to a station; and
   each radio channel corresponds to the tuned station from the corresponding decoder.

5. The system of claim 1, wherein the system is a satellite radio receiver system.

6. The system of claim 1, further comprising a non-volatile memory, wherein the multi-channel control processor is adapted to preset one or more recoding parameters for recording of the second radio channel to the non-volatile memory.

7. The system of claim 6, wherein the one or more recording parameters comprise a recording start time and one or more of:
   a station selection for the second radio channel;
   a recording duration; and
   a recording end time.

8. The system of claim 1, wherein each radio channel comprises one or more of audio, video, and data.

9. The system of claim 1, further comprising a second speaker, wherein the multi-channel control processor is adapted to output the second radio channel for playing on the second speaker while simultaneously outputting the first radio channel for playing on the first speaker.

10. The system of claim 1, further comprising a microphone adapted to convert the at least one vocal command into an electrical signal provided to the voice-recognition command interpreter.

11. The system of claim 10, wherein the voice-recognition command interpreter comprises an interfering-sound canceller and a command-recognition module, wherein:
    the interfering-sound canceller is adapted to:
       receive a first signal corresponding to the first radio channel;
       receive a second signal corresponding to the electrical signal provided by the microphone;
       generate a third signal based on a difference between the first signal and the second signal; and
       provide the third signal to the command-recognition module; and
    the command-recognition module is adapted to recognize the at least one vocal command based on the third signal and output the control signal to the multi-channel control processor.

12. The system of claim 11, wherein the interfering-sound canceller is further adapted to reduce echoes in the second signal.

13. The system of claim 11, wherein:
    the voice-recognition command interpreter further comprises a digital down-converter adapted to down-sample the first radio channel to provide the first signal to the interfering-sound canceller; and
    one of:
       the electrical signal is digital and is substantially equivalent to the second signal; and
       the electrical signal is analog and the voice-recognition command interpreter further comprises an A/D converter (ADC) adapted to provide the second signal to the interfering-sound canceller based on the electrical signal received from the microphone.

14. The system of claim 10, wherein:
    the microphone comprises (i) a directional microphone providing a directional signal and (ii) an ambient microphone providing an ambient signal; and
    the microphone is adapted to generate the electrical signal based on a difference between the ambient signal and the directional signal to reduce interfering sounds.

15. The system of claim 1, wherein:
    the multi-channel control processor further comprises a command controller adapted to receive the control signal and control the radio controller to modify the processing of the second radio channel; and
    the other component is different from the first speaker.

16. The system of claim 1, wherein the command controller is further adapted to receive from an additional user-input device an additional control signal for modifying the processing of the second radio channel.

17. The system of claim 1, wherein the multi-channel control processor further comprises a D/A converter (DAC) adapted to receive the first radio channel and provide a corresponding analog signal to the first speaker.

18. The system of claim 1, wherein the voice-command recognition module is adapted to recognize an invalid vocal command and provide an indication that the invalid vocal command was provided.

19. The system of claim 1, wherein the outputting of the first radio channel for playing on the first speaker includes wireless transmission.

20. The system of claim 1, wherein the voice-recognition command interpreter is adapted to recognize at least one other vocal command and output a second control signal to cause the multi-channel control processor to modify processing of the first radio channel based on the recognized other vocal command.

21. A system comprising:
   a first speaker;
   a multi-channel control processor adapted to simultaneously process (1) a first radio channel, which is outputted by the multi-channel control processor for playing on the first speaker and (2) a second radio channel different from the first radio channel, which second radio channel is not outputted by the multi-channel control processor for playing on the first speaker; and
   a voice-recognition command interpreter adapted to:
      recognize at least one vocal command while the first radio channel is played on the first speaker and the second radio channel is not played on the first speaker; and
      output a control signal to cause the multi-channel control processor to modify processing of the second radio channel based on the recognized vocal command while the first radio channel is played on the first speaker, wherein:
   the multi-channel control processor is connected to multiple decoders;
   a first decoder of the multiple decoders provides the first radio channel to the multi-channel control processor; and
   a second decoder of the multiple decoders provides the second radio channel to the multi-channel control processor.

22. A system comprising:
   a first speaker;
   a multi-channel control processor adapted to simultaneously process (1) a first radio channel, which is outputted by the multi-channel control processor for playing on the first speaker and (2) a second radio channel different from the first radio channel, which second radio channel is not outputted by the multi-channel control processor for playing on the first speaker;
   a voice-recognition command interpreter adapted to:
      recognize at least one vocal command while the first radio channel is played on the first speaker and the second radio channel is not played on the first speaker; and
      output a control signal to cause the multi-channel control processor to modify processing of the second radio channel based on the recognized vocal command while the first radio channel is played on the first speaker; and
   a second speaker, wherein the multi-channel control processor is adapted to output the second radio channel for playing on the second speaker while simultaneously outputting the first radio channel for playing on the first speaker.

\* \* \* \* \*